US012764648B2

(12) United States Patent
Hong et al.

(10) Patent No.: US 12,764,648 B2
(45) Date of Patent: Oct. 13, 2026

(54) METHOD AND APPARATUS FOR SELECTING NETWORK SLICE ADMISSION CONTROL FUNCTION

(71) Applicant: BEIJING XIAOMI MOBILE SOFTWARE CO., LTD., Beijing (CN)

(72) Inventors: Wei Hong, Beijing (CN); Yang Shen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 339 days.

(21) Appl. No.: 18/681,832

(22) PCT Filed: Aug. 6, 2021

(86) PCT No.: PCT/CN2021/111316
§ 371 (c)(1),
(2) Date: Feb. 6, 2024

(87) PCT Pub. No.: WO2023/010567
PCT Pub. Date: Feb. 9, 2023

(65) Prior Publication Data

US 2024/0349178 A1 Oct. 17, 2024

(51) Int. Cl.
*H04W 48/18* (2009.01)

(52) U.S. Cl.
CPC .................................. *H04W 48/18* (2013.01)

(58) Field of Classification Search
CPC ..................................................... H04W 48/18
See application file for complete search history.

(56) References Cited

U.S. PATENT DOCUMENTS

2024/0349218 A1* 10/2024 Atarius ................. H04W 48/18

FOREIGN PATENT DOCUMENTS

WO WO 2022029727 A1 2/2022

OTHER PUBLICATIONS

"3rd Generation Partnership Project; Technical Specification Group Services and System Aspects; System architecture for the 5G System (5GS); Stage 2 (Release 17)", 3GPP Standard; 3GPP TS 23.501, 3rd Generation Partnership Project (3GPP), Mobile Competence Centre; 650, Route Des Lucioles; France. (Year: 2021).*

"Network Slice Admission Control Function (NSACF) services and procedures", 3GPP Draft; TS23.502 KI#2, 3rd Generation Partnership Project (3GPP), Mobile Competence Centre; 650, Route Des Lucioles; France. (Year: 2021).*

PCT/CN2021/11316 International Search Report dated May 9, 2022, 3 pages.

NTT Docomo: "Updates of NSACF discovery and selection" 3GPP TSG-SA WG2 Meeting #144E e-meeting, S2-2102323, Apr. 2021, 3 pages.

(Continued)

*Primary Examiner* — Myron Wyche
(74) *Attorney, Agent, or Firm* — Cozen O'Connor

(57) ABSTRACT

The present disclosure provides a method and an apparatus for selecting a network slice admission control function (NSACF). The method includes selecting an NSACF for a network slice based on service area information of the NSACF. The NSACF selected is used to monitor a number of created protocol data unit (PDU) sessions of the network slice.

20 Claims, 5 Drawing Sheets

(56) References Cited

OTHER PUBLICATIONS

NTT Docomo: "Updates of NSACF discovery and selection" 3GPP TSG-SA WG2 Meeting #144E e-meeting S2-2103466, Apr. 2021, 3 pages.
CATT "TS23.502 KI#2 Network Slice Admission Control Function (NSACF) services and procedures" 3GPP TSG-SA WG2 Meeting #145E, S2-2104422, May 2021, 5 pages.
3rd Generation Partnership Project; Technical Specification Group Services and System Aspects; System architecture for the 5G System (5GS); Stage 2(Release 17), 3GPP TS 23.501, Jun. 2021, 526 pages.
European Patent Application No. 21952440.2, Search and Opinion dated May 12, 2025, 12 pages.

* cited by examiner

METHOD AND APPARATUS FOR SELECTING NETWORK SLICE ADMISSION CONTROL FUNCTION

CROSS-REFERENCE TO RELATED APPLICATIONS

The present application is a US national phase entry under 35 USC § 371 of International Application PCT/CN2021/111316, filed Aug. 6, 2021, the entire content of which is incorporated herein by reference.

TECHNICAL FIELD

The present disclosure relates to a mobile communication technical field, and more particularly to a method for selecting a network slice admission control function (NSACF) and an apparatus for selecting a network slice admission control function (NSACF).

BACKGROUND

A network slice technology allows operators to provide various customized networks, for example, networks with different functional requirements, or networks with different performance requirements, such as different latency, mobility, availability, reliability and data rate bandwidth requirements; or only provide network functionality to specific users, such as multimedia system users, public safety users, corporate customers, roamers, or mobile virtual network operator hosting.

Currently, the network function (NF) generally utilizes the network storage function (NRF) to perform discovery and selection. However, it is a key issue that need to be solved how to select an appropriate NSACF, such that it is more conducive to the implementation of the monitoring and statistics execution function of the number of UEs of the network slice and the monitoring and statistics execution function of the number of slice sessions, such as less signaling interaction and reduction of switching a plurality of functions brought by UE mobility, thereby optimizing function execution.

SUMMARY

The present disclosure provides a method for selecting a network slice admission control function (NSACF) and an apparatus for selecting a network slice admission control function (NSACF), which are capable of selecting an appropriate NSACF more accurately and with less signaling and functional interactions.

In a first aspect, embodiments of the present disclosure provide a method for selecting a network slice admission control function (NSACF). The method is performed by a first session management function (SMF) and includes selecting an NSACF for a network slice based on service area information of the NSACF. The NSACF selected is used to monitor a number of created protocol data unit (PDU) sessions of the network slice.

In a second aspect, embodiments of the present disclosure provide a communication device including a transceiver; a memory; and a processor, respectively connected to the transceiver and the memory and configured to control wireless signal transmission and reception of the transceiver and implement the method for selecting a network slice admission control function (NSACF) in embodiments of the first aspect by executing computer-executable instructions on the memory.

Additional aspects and advantages of the present disclosure will be set forth in part in the description which follows, and in part will be obvious from the description, or may be learned by practice of the disclosure.

BRIEF DESCRIPTION OF THE DRAWINGS

These above-mentioned and/or additional aspects and advantages of embodiments of the present disclosure will become apparent and more readily appreciated from the following descriptions made with reference to the drawings, in which.

DETAILED DESCRIPTION

Figure 1:
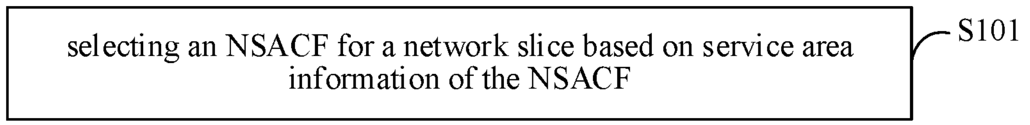
FIG. 1 is a schematic flowchart of a method for selecting a network slice admission control function (NSACF) provided by an embodiment of the present disclosure.

Embodiments of the present disclosure are described in detail below, examples of which are illustrated in the accompanying drawings. The same or similar reference numerals throughout represent the same or similar elements or elements having the same or similar functions. The embodiments described below with reference to the accompanying drawings are exemplary and intended to explain the present disclosure and are not to be construed as limitations of the present disclosure.

A network slice technology allows operators to provide various customized networks, for example, if there are differences between functional requirements (e.g., priority, charging, policy control, security, and mobility) and there are differences between performance requirements (e.g., latency, mobility, availability, reliability and data speed), or only for specific users (e.g., multimedia system users, public safety users, corporate customers, roamers, or mobile virtual network operator hosting), services may be provided.

A network slice may provide complete network functions, including wireless access network functions, core network functions and IP multimedia subsystem (IMS) functions. A network may support one or more network slices. Due to differences in the supported network features and the performance, differences exist between the network slices. A network slice instance refers to an instantiation of the network slice, that is, a set of deployed network capabilities that delivers intended network slice serves according to a network slice template.

The features and network function optimization supported by individual network slice may be different, and the individual network slice may have different single-network slice selection assistance information (S-NSSAI) to identify different slices or service types. The S-NSSAIs have different slice/service types.

The operator may deploy a plurality of network slices for different groups or types of UEs that provide the same functions, such as transmitting different service characteristics or providing users specific networks. Each slice in this scenario may have the same type, but be identified with different S-NSSAIs.

The selection of a set of network slice instances of the UE is generally triggered by a first access and mobility management function (AMF) in a registration process. The AMF is interacted with a network slice selection function (NSSF). The selection of the slice may result in reselection of the AMF. A protocol data unit (PDU) session belongs and belongs only to a specific network slice instance in a public land mobile network (PLMN). Although different network slice instances may have PDU sessions for a specific slice using the same DNN, different network slice instances do not share the same PDU session. During a switching process, a source AMF selects a target AMF by interacting with a network repository function (NRF).

The network slice type (NEST) is applied to a network slice. One network slice may deploy a plurality of network slice instances. A generic network slice template (GST) defines attributes supported by the network slice, such as, 1) a number of terminals, which describes the maximum number of terminals that use the network slice at the same time; 2) a number of connections, which describes the maximum number of concurrent sessions supported by the network slice, which are important input for determining a scale of the network slice and providing sufficient resources for the network slice.

The network slice may support a limited number of user equipments (UEs) to use the network slice simultaneously and a limited number of concurrent sessions. In order to support the control of the number of terminals and the number of protocol data unit (PDU) sessions regarding the network slice, a network slice admission control function (NSACF) is introduced in a 5G communication system. For the network slices subjected to network slice admission control (NSAC), the NSACF monitors a number of registered UEs of each network slice and the number of PDU sessions of each network slice.

In the network, a plurality of NSACFs may be deployed, or a plurality of NSACF instances may be deployed. The operator network may include the following different NSACF deployment solutions. A network slice deploys a plurality of NSACFs, or a plurality of NSACFs serves a plurality of network slices of a large network to facilitate elasticity. Single or a plurality of NSACFs are dedicated to a specific network slice to provide customized services, such as isolating slices. In addition, when a plurality of network slice instances are used in a network slice, the above-mentioned solutions are also available.

Regarding discovery and selection of the NSACF, a network function (NF) is generally performed by using a network repository function (NRF). Regarding the discovery and the selection of the NSACF, network functions of a discovery end may be performed through the NRF or through operator policies such as local configuration. This scheme is applied to the discovery and the selection of the NSACFs or the NSACF instances. It is a key issue that need to be solved how to select an appropriate NSACF more accurately and with less signaling, such that it is more conducive to the implementation of the monitoring and statistics execution function of the number of UEs of the network slice and the monitoring and statistics execution function of the number of slice sessions, such as less signaling interaction or function interaction, thereby supporting and optimizing function execution.

A plurality of NSACFs may be deployed in the PLMN, but how to select the appropriate NSACF more accurately and with less signaling interaction or functional interaction is still a key issue that needs to be solved.

Thus, objects of the present disclosure is to select an appropriate NSACF taking into account factors such as the need for the NSACF per area; select an appropriate NSACF with less signaling, such as less status notification and report for transmitting the network slice, or NF device relocation and the like; and select an appropriate NSACF with higher accuracy.

The present disclosure provides a method for selecting an NSACF and an apparatus for selecting an NSACF. A SMF selects the NSACF for a network slice based on service area information of the NSACF. By considering the service area information of the NSACF to select the NSACF, an appropriate NSACF may be selected more accurately and with less signaling and functional interaction.

The method for selecting the NSACF and the apparatus for selecting the NSACF provided by the present disclosure will be introduced in detail below with reference to the accompanying drawings.

FIG. 1 shows a schematic flowchart of a method for selecting an NSACF according to an embodiment of the present disclosure. As shown in FIG. 1, the method may be performed by a session management function (SMF). In the following, the SMF that performs the method for selecting the NSACF may be called a first SMF, and the method includes the following steps.

In step S101, an NSACF is selected for a network slice based on service area information of the NSACF. The NSACF selected is used to monitor a number of created protocol data unit (PDU) sessions of the network slice.

A plurality of NSACFs may be deployed in a network such as a PLMN, but there is still a lack of effective technical means on how to select an NSACF from a large number of NSACFs.

Therefore, embodiments of the present application provides a method for selecting an NSACF. The first SMF selects the NSACF for the network slice based on the service area information of the NSACF.

It is noted that when the deployed NSACF has a plurality of NSACF instances, the method for selecting the NSACF in embodiments is also applicable, that is, the NSACF instance may be selected based on the service area information of the NSACF instance. The specific details will not be repeated here.

In some embodiments, the service area information includes any one or more of: a tracking area identity list; service area information of the SMF; or service area information of one or more user plane functions (UPFs) controlled by the SMF.

The service area information of the NSACF may include a tracking area identity (TAI) list, and the first SMF may select the NSACF for the network slice based on the TAI list of the NSACF. The tracking area (TA) is defined as a free movement area where the user equipment (UE) does not need to update services. The TA is a cell-level configuration. A plurality of cells may be configured with the same TA, and one cell may only belong to one TA. The TAI is an identity of TA, and consists of the PLMN and a tracking area code (TAC). A plurality of TAs may form a TA list, and be allocated to a UE at the same time. When the UE moves within the TA list, it does not need to perform TA updates, which reduces frequent interactions with the network. When the UE enters a new TA that is not in a registered TA list, update of the TA needs to be performed, so that the UE is reassigned with a set of TAs. For example, in case of a PDU session creation of the UE, the first SMF needs to select the NSACF for the corresponding network slice (e.g., an S-NSSAIs identity included in the PDU session creation request from the UE). If the service area information of the NSACF includes the TAI list, the first SMF may select the NSACF based on the TAI list of the NSACF to monitor the number of the created PDU sessions of the network slice. The TAI list of the NSACF selected includes, for example, the identity of the TA in the TA list allocated by the UE.

The service area information of the NSACF may include the service area information of the SMF, and the first SMF selects the NSACF for the network slice based on the service area information of the SMF owned by the NSACF. For example, in case of the PDU session creation of UE, the first SMF needs to select the NSACF for the corresponding network slice (e.g., the S-NSSAIs identity included in the PDU session creation request from the UE). If the service area information of the NSACF includes the service area information of the SMF, the first SMF may select the NSACF based on the service area information of the SMF owned by the NSACF to monitor the number of the created PDU sessions of the network slice. The service area information of the SMF owned by the NSACF selected is, for example, the service area information of the first SMF.

The service area information of the NSACF may include service area information of one or more user plane functions (UPFs) controlled by the SMF, and the first SMF selects the NSACF for the network slice based on the service area information of the UPF owned by the NSACF. For example, in case of PDU session creation of the UE, the first SMF needs to select the NSACF for the corresponding network slice (e.g., the S-NSSAIs identity included in the PDU session creation request from the UE). If the service area information of the NSACF includes the service area information of the UE, the first SMF may select the NSACF based on the service area information of the UPF owned by the NSACF to monitor the number of the created PDU sessions of the network slice. The service area information of the UPF owned by the NSACF selected is, for example, the service area information of the UPF controlled by the first SMF.

According to the method for selecting the NSACF in embodiments of the present disclosure, the SMF may select the NSACF for the network slice based on the service area information of the NSACF. By considering the service area information of the NSACF, the appropriate NSACF may be selected more accurately and with less signaling and functional interaction.

Figure 2:
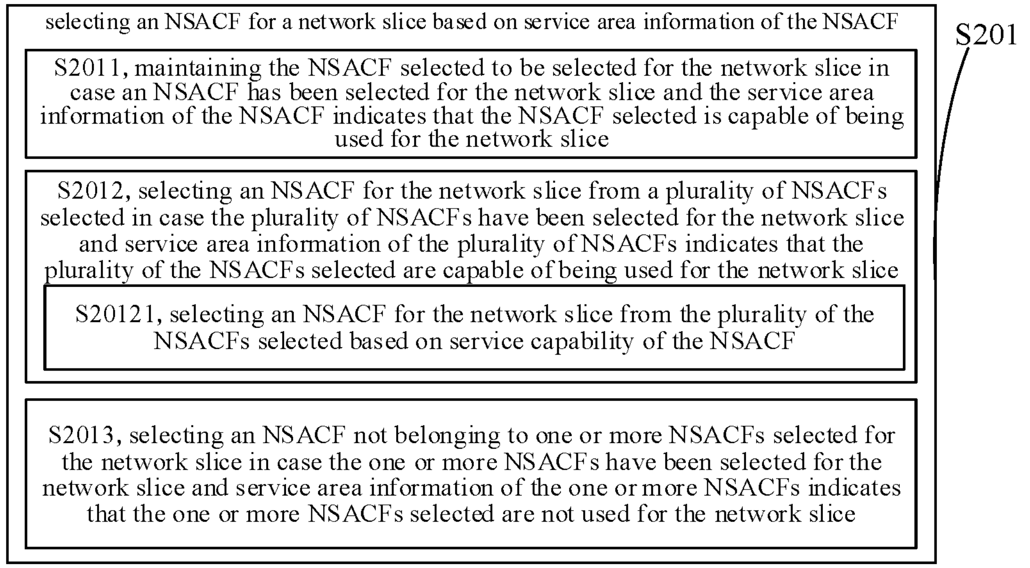
FIG. 2 is a schematic flowchart of a method for selecting a network slice admission control function (NSACF) provided by an embodiment of the present disclosure.

FIG. 2 shows a schematic flowchart of a method for selecting an NSACF according to an embodiment of the present disclosure. The method may be performed by a first SMF. As shown in FIG. 2, the method may include the following steps.

In step S201, an NSACF is selected for a network slice based on service area information of the NSACF. The NSACF selected is used to monitor a number of created protocol data unit (PDU) sessions of the network slice.

In some embodiments, the service area information may include any one or more of a tracking area identity list; service area information of the SMF; or service area information of one or more user plane functions (UPFs) controlled by the SMF.

For specific details of the step S201, reference may be made to the step S101 and its related description in FIG. 1, which will not be described again here.

In embodiments of the present disclosure, the above-mentioned step S201 may include any of the following steps.

In step S2011, in case that an NSACF has been selected for the network slice and the service area information of the NSACF indicates that the NSACF selected is capable of being used for the network slice, the NSACF selected is maintained to be selected for the network slice When the first SMF selects the NSACF for the network slice, there is a situation where an NSACF has already been selected for the network slice. For example, since the NSACF may have been selected for the corresponding network slice during a PDU session creation process of the UE, if the S-NSSAIs carried in the PDU session update request still identify the network slice, the above-mentioned situation may occur.

In this case, if the service area information of the NSACF selected indicates that it is capable of being used for the network slice, the first SMF still selects the NSACF to monitor the number of the created PDU sessions of the network slice, that is, the NSACF selected is maintained to be used for the network slice.

For example, as shown in embodiments with reference to FIG. 1, when the service area information of the NSACF selected is the TAI list, if the TAI list includes the identity of the TA in the TA list allocated by the UE that requests the service of monitoring the number of the created PDU sessions of the network slice, it indicates that the NSACF selected is capable of being used for the network slice, and the first SMF maintains the NSACF selected for monitoring the number of the created PDU sessions by the network slice. For another example, when the service area information of the NSACF selected is the service area information of the SMF, if the service area information of the SMF owned by the NSACF selected is the service area information of the first SMF, it indicates that the NSACF selected is capable of being used for the network slice, and the first SMF maintains the NSACF selected for monitoring the number of the created PDU sessions of the network slice. For another example, when the service area information of the NSACF selected is the service area information of the UPF, if the service area information of the UPF owned by the NSACF selected is the service area information of the UPF controlled by the first SMF, it indicates that the NSACF selected is capable of being used for the network slice, and the first SMF maintains the NSACF selected for monitoring the number of the created PDU sessions of the network slice.

In step S2012, in case that the plurality of NSACFs have been selected for the network slice and service area information of the plurality of NSACFs indicates that the plurality of the NSACFs selected are capable of being used for the network slice, the NSACF is selected for the network slice from the plurality of NSACFs selected.

When the first SMF selects the NSACF for the network slice, there is a situation where the plurality of NSACFs have already been selected for the network slice.

In this case, if the service area information of the plurality of NSACFs selected indicates that the plurality of NSACFs selected are capable of being used for the network slice, the first SMF may select the NSACF from the plurality of NSACF selected for monitoring the number of the created PDU sessions of the network slice.

In some embodiments, the above-mentioned step S2012 may include the following steps.

In step S20121, the NSACF is selected for the network slice from the plurality of the NSACFs selected based on service capability of the NSACF.

The service capability includes at least one of a first service capability that supports monitoring a number of registered user equipments (UEs) of the network slice, or a second service capability that supports monitoring a number of the created PDU sessions of the network slice.

The NSACF may have a variety of different service capabilities. For example, the NSACF may have a service capability that only supports monitoring the number of registered UEs of the network slice, or the NSACF may have a service capability that only supports monitoring the number of the created PDU sessions of the network slice, or the NSACF may have a service capability that supports both monitoring the number of the registered UEs of the network slice and monitoring the number of the created PDU sessions of the network slice. If the NSACF is directly selected without considering the service capabilities of the NSACF, it is possible to select an NSACF that does not meet the requirements. For example, in the case of PDU session creation, if the first SMF directly select the NSACF for the network slice without considering the service capabilities of the NSACF, it is possible to select the NSACF that does not have the service capability to support monitoring the number of the created PDU sessions of the network slice, that is, the NSACF that does not meet the requirements is selected.

Therefore, when the first SMF selects the NSACF for the network slice from the plurality of NSACFs selected, the service capability of the NSACF may also be considered to implement the selection of the NSACF.

Specifically, the first SMF may select an NSACF for the network slice from the plurality of NSACFs selected, and the NSACF has the service capability that only supports monitoring the number of the created PDU sessions of the network slice, or select an NSACF that has a service capability that supports both monitoring the number of registered UEs of the network slice and monitoring the number of the created PDU sessions of the network slice, so as to monitor the number of the created PDU sessions of the network slice.

In step S2013, in case that one or more NSACFs have been selected for the network slice and service area information of the one or more NSACFs indicates that the one or more NSACFs selected are not used for the network slice, an NSACF not belonging to the one or more NSACFs selected is selected for the network slice.

As described above, when the first SMF selects the NSACF for the network slice, there may be a situation where the one or more NSACFs have already been selected for the network slice.

In this case, if the service area information of the one or more NSACFs selected indicates that the one or more NSACFs selected are not used for the network slice, the first SMF selects a new NSACF for the network slice for monitoring the number of the created PDU sessions of the network slice, and the new NSACF does not belong to the one or more NSACFs selected.

For example, as shown in embodiments with reference to FIG. 1, when the service area information of the one or more NSACFs is selected as the TAI list, if the TAI list of each NSACF in the one or more NSACFs does not include the identity of the TA in the TA list allocated by the UE that requests a service to monitor the number of the created PDU sessions of the network slice, it indicates that one or more NSACFs selected are not the appropriate NSACFs for the network slice. The first SMF selects a new and more appropriate NSACF to monitor the number of the created PDU sessions for the network slice. For another example, when the service area information of one or more NSACFs selected is the service area information of the SMF, if the service area information of the SMF owned by each NSACF in the one or more NSACFs selected is not the service area information of the first SMF, it indicates that the one or more NSACFs selected are not appropriate NSACFs for the network slice. The first SMF selects a new and more appropriate NSACF for the network slice to monitor the number of the created PDU sessions of the network slice. For another example, when the service area information of the one or more NSACFs selected is the service area information of the UPF, if the service area information of the UPF owed by each NSACF in the one or more NSACFs selected is not affected by the service area information of the UPF controlled by the first SMF, it indicates that one or more NSACFs selected are not the appropriate NSACFs for the network slice. The first SMF selects a new and more appropriate NSACF for the network slice to monitor the number of the created PDU sessions of the network slice.

According to the method for selecting the NSACF in embodiments of the present disclosure, the SMF may select the NSACF for the network slice by considering the service area information of the NSACF selected in cast that an NSACF has been currently selected for the network slice, so that the appropriate NSACF may be selected more accurately and with less signaling and function interactions.

Figure 3:
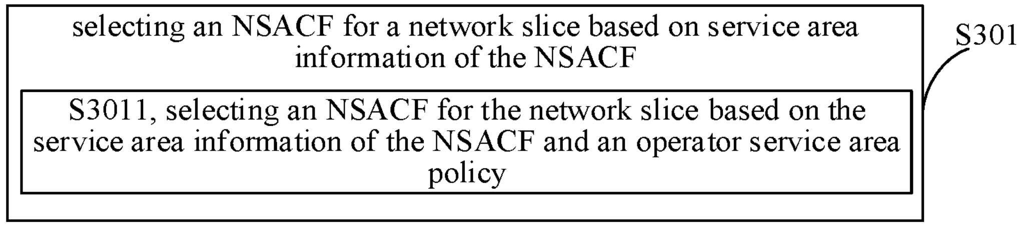
FIG. 3 is a schematic flowchart of a method for selecting a network slice admission control function (NSACF) provided by an embodiment of the present disclosure.

FIG. 3 shows a schematic flowchart of a method for selecting an NSACF according to an embodiment of the present disclosure. The method may be performed by a first SMF. As shown in FIG. 3, the method may include the following steps.

In step S301, an NSACF is selected for a network slice based on service area information of the NSACF. The NSACF selected is used to monitor a number of created protocol data unit (PDU) sessions of the network slice.

In some embodiments, the service area information may include any one or more of a tracking area identity list; service area information of the SMF; or service area information of one or more user plane functions (UPFs) controlled by the SMF.

For specific details of S301, reference may be made to the relevant description of step S101 in FIG. 1, and will not be described again here.

In embodiments of the present disclosure, when an operator service area policy exists, the following steps may be further used to select the NSACF for the network slice.

In step S3011, the NSACF is selected for the network slice based on the service area information of the NSACF and the operator service area policy.

The operator service area policy includes a specific rule formulated by an operator to perform NSACF selection based on the service area information.

In embodiments of the present disclosure, when the operator service area policy exists, the first SMF selects the NSACF for the network slice based on the operator service area policy and the service area information of the NSACF, so that the NSACF selected may satisfy the operator service area policy.

The operator service area policy may include the TAI list, the service area information of the SMF, a policy priority of the service area information of the one or more UPFs controlled by the SMF, a priority of each NSACF that has a service capability that supports monitoring the number of the created PDU sessions of the network slice, location information of the UE that requests a service of monitoring the number of the created PDU sessions of the network slice, or registration tracking area information of the UE that requests a service of monitoring the number of the created PDU sessions of the network slice, etc. It is noted that the operator service area policy listed here are only examples. In actual applications, each operator may develop various operator service area policies according to its own needs, which will not be limited in the present disclosure.

For example, as shown in embodiments with reference to FIG. 1, when the service area information of the NSACF is the TAI list, if the operator service area policy is to select an NSACF of a TA list that completely matches the TAI list of the UEs that requests a service to monitor the number of the created PDU session of the network slice, the first SMF selects an NSACF that satisfies the operator service area policy for the network slice based on the TAI list of the NSACF. Specifically, for example, if three NSACFs exist, which are represented as NSACF1 to NSACF3 respectively. A TAI list of the NSACF1 includes an identifier TAI1 of TA1, an identifier TAI2 of TA2, and an identifier TAI3 of TA3, a TAI list of NSACF2 includes an identifier TAI1 of TA1, an identifier TAI2 of TA2, and an identifier TAI4 of TA4, and a TAI list of NSACF3 includes an identifier TAI1 of TA1, an identifier TAI3 of TA3 and an identifier TAI4 of TA4. A TA list allocated by the UE that requests a service of monitoring the number of the created PDU sessions of the network slice includes TAI, TA2 and TA3. Then the first SMF will select NSACF1 to monitor the number of the created PDU sessions of the network slice, because the TAI list of NSACF1 completely matches the TA list allocated by the UE and complies with the operator service area policy.

For another example, if the operator service area policy is that the service area information of the one or more UPFs controlled by the SMF has the highest policy priority, the first SMF will select the NSACF for the network slice by considering the service area information of the UPF controlled by the first SMF based on the TAI list of the NSACF. Specifically, since the operator service area policy indicates that the service area information of the UPF is prior, the first SMF may select an NSACF whose TAI list matching the service area information of the UPF controlled by the first SMF by considering the service area information of the UPF controlled by the first SMF.

In some embodiments, the operator service area policy is preconfigured in at least one of the first SMF or the NRF.

The operator service area policy is preconfigured in the first SMF or may also be preconfigured in the NRF. When the operator service area policy is preconfigured in the NRF, the first SMF may obtain the operator service area policy by accessing the NRF.

In some embodiments, if an NSACF has been selected for network slice and both the service area information of the NSACF and the operator service area policy indicate that the NSACF selected is capable of being used for the network slice, the first SMF maintains the NSACF selected to be selected for the network slice.

For example, when the service area information of the NSACF selected is the TAI list and the operator service area policy is to select an NSACF in the TAI list that completely matches the TA list of the UE that requests the service of monitoring the number of the created PDU sessions of the network slice, if the TAI list of the NSACF selected completely matches the TA list allocated by the UE, it indicates that the NSACF selected is capable being used for the network slice. The first SMF maintains the NSACF selected for monitoring the number of the created PDU sessions.

In some embodiments, if a plurality of NSACFs have been selected for the network slice and the service area information of the NSACF and the operator service area policy indicate that the plurality of NSACFs selected are capable of being used for the network slice, the first SMF selects an NSACF for the network slice from the plurality of NSACFs. Specifically, the first SMF may select the NSACF for the network slice from the plurality of NSACFs selected based on the service capabilities of the NSACF. For relevant details, reference may be made to the relevant description of step S2012 in FIG. 2.

In some embodiments, if one or more NSACFs have been selected for the network slice and the service area information of the NSACF or the operator service area policy indicates that each NSACF is not used for the network slice, the first SMF select an NSACF not belonging to the one or more NSACFs selected for the network slice based on the operator service area policy and the service area information of the NSACF.

For example, when the service area information of the one or more NSACFs selected is the TAI list and the operator service area policy is to select an NSACF of TAI list that completely matches the TA list of the UE that requests the service of monitoring the number of the created PDU sessions of the network slice, if the TAI list of each NSACF in the one or more NSACFs does not include the identity of the TA in the TA list allocated by the UE that requests the service of monitoring the number of the created PDU sessions of the network slice, or if the TAI list of some NSACFs of the one or more NSACFs selected includes the identity of the TA in the TA list allocated by the UE, but does not completely match the TA list allocated by the UE, it indicates that the one or more NSACFs selected are not suitable for the network slice, and the first SMF selects a new and more appropriate NSACF for the network slice to monitor the number of the created PDU sessions of the network slice.

According to the method for selecting the NSACF in embodiments of the present disclosure, if the operator service area policy exists, the SMF will select the NSACF based on the service area information of the NSACF according to the operator service area policy, so that the NSACF selected may meet the operator service area policy.

Figure 4:
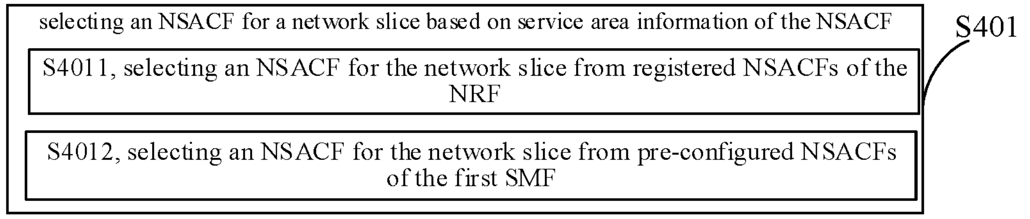
FIG. 4 is a schematic flowchart of a method for selecting a network slice admission control function (NSACF) provided by an embodiment of the present disclosure.

FIG. 4 shows a schematic flowchart of a method for selecting an NSACF according to an embodiment of the present disclosure. The method may be performed by a first SMF. As shown in FIG. 4, the method may include the following steps.

In step S401, an NSACF is selected for a network slice based on service area information of the NSACF. The NSACF selected is used to monitor a number of created protocol data unit (PDU) sessions of the network slice.

In some embodiments, the service area information may include any one or more of a tracking area identity list; service area information of the SMF; or service area information of one or more user plane functions (UPFs) controlled by the SMF.

For specific details of S401, reference may be made to the relevant description of step S101 in FIG. 1, which will not be described again here.

In embodiments of the present disclosure, the above-mentioned step S401 may include any of the following steps.

In step S4011, the NSACF is selected for the network slice from registered NSACFs of the NRF. The NRF stores configuration information of the registered NSACFs, and the configuration information includes single-network slice selection assistance information (S-NSSAI) and service area information of the registered NSACFs.

The NSACF may be registered in the NRF, the NSACF provides its configuration information to the NRF, and the NRF marks the NSACF as available. During the NSACF registration process, the NSACF provides the S-NSSAIs and the service area information of the NSACF, that is, the configuration information of the registered NSACF in the NRF may include the S-NSSAIs and its service area information. The first SMF may utilize the NRF to discover and select the NSACF.

The S-NSSAIs may include a plurality of S-NSSAIs. The S-NSSAI identifies the network slices, which is auxiliary information used by the network to select a specific network slice instance. The S-NSSAIs may include: a slice service type (SST), which indicates network slices with different functions and services; or silence differentiator, which is used to further distinguish optional information that supplements the SST of the network slice instance from all network slice instances that conform to the SST type.

In some embodiments, the first SMF selects the NSACF for the network slice from the registered NSACFs in the NRF based on the service area information of the NSACF.

Regarding the specific details of how the first SMF selects the NSACF based on the service area information of the NSACF, reference may be made to the relevant description of step S101 in FIG. 1, which will not be described again here.

In some embodiments, if one or more NSACFs have been selected for the network slice and the service area information of the one or more NSACFs indicates that the NSACFs selected are not used for the network slice, the first SMF selects an NSACF not belonging to the one or more NSACF selected for the network slice from the registered NSACFs in the NRF based on the service area information of the NSACF.

For specific details on how the first SMF selects the NSACF not belonging to the one or more NSACF selected in this case, reference may be made to the relevant description of step S2013 in FIG. 2, which will not be described again here.

In some embodiments, when the operator service area policy exist, the first SMF selects the NSACF from the registered NSACFs in the NRF based on the service area information of the NSACF and the operator service area policy. If the one or more NSACFs have been selected for the network slice and the service area information of the one or more NSACFs or the operator service area policy indicates that the one or more NSACFs selected are not be used for the network slice, the first SMF selects the NSACF not belonging to the one or more NSACFs selected for the network slice from the registered NSACFs in the NRF based on the service area information of the NSACF and the operator service area policy.

For specific details on how the first SMF selects the NSACF based on the service area information of the NSACF and the operator service area policy, reference may be made to the relevant description of step S3011 in FIG. 3, which will not be described again here.

In step S4012, an NSACF is selected from a pre-configured NSACF of the first SMF. The first SMF stores configuration information of the pre-configured NSACFs, and the configuration information includes S-NSSAIs and service area information of the pre-configured NSACFs.

The NSACF may be configured locally in the first SMF, and the configuration information of the NSACF may indicate the S-NSSAIs and the service area information of the NSACF. The first SMF may utilize the configuration information to discover and select the NSACF.

In some embodiments, the first SMF selects the NSACF from the pre-configured NSACFs of the first SMF based on the service area information of the NSACF.

Regarding the specific details of how the first SMF selects the NSACF based on the service area information of the NSACF, reference may be made to the relevant description of step S101 in FIG. 1, which will not be described again here.

In some embodiments, if the one or more NSACFs have been selected for the network slice and the service area information of the one or more NSACFs indicates that the one or more NSACFs selected are not used for the network slice, the first SMF select an NSACF not belonging to the one or more NSACFs selected for the network slice from the pre-configured NSACFs of the first SMF based on the service area information of the NSACF.

For specific details on how the first SMF selects the NSACF not belonging to the one or more NSACFs selected in this case, reference may be made to the relevant description of step S2013 in FIG. 2, which will not be described again here.

In some embodiments, when the operator service area policy exist, the first SMF selects the NSACF from the pre-configured NSACF of the first SMF based on the service area information of the NSACF and the operator service area policy. If the one or more NSACFs have been selected for the network slice and the service area information of the one or more NSACFs or the operator service area policy indicates that the one or more NSACFs selected are not be used for the network slice, the first SMF selects the NSACF not belonging to the one or more NSACFs selected for the network slice from the pre-configured NSACF of the first SMF based on the service area information of the NSACF and the operator service area policy.

For specific details on how the first SMF selects the NSACF based on the service area information of the NSACF and the operator service area policy, reference may be made to the relevant description of step S3011 in FIG. 3, which will not be described again here.

According to the method for selecting the NSACF in embodiments of the present disclosure, the SMF may select the corresponding NSACF from the NRF or from the local preference, thereby avoiding the complex NSACF selection process and reducing signaling transmission.

Figure 5:
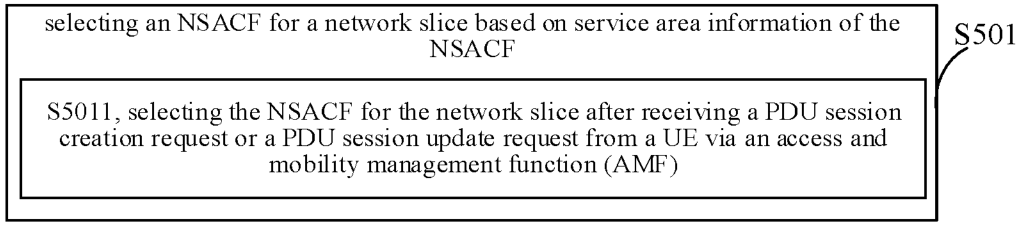
FIG. 5 is a schematic flowchart of a method for selecting a network slice admission control function (NSACF) provided by an embodiment of the present disclosure.

FIG. 5 shows a schematic flowchart of a method for selecting an NSACF according to an embodiment of the present disclosure. The method may be performed by a first SMF. As shown in FIG. 5, the method may include the following steps.

In step S501, an NSACF is selected for a network slice based on service area information of the NSACF. The NSACF selected is used to monitor a number of created protocol data unit (PDU) sessions of the network slice.

In some embodiments, the service area information may include any one or more of a tracking area identity list; service area information of the SMF; or service area information of one or more user plane functions (UPFs) controlled by the SMF.

For specific details of the step S501, reference may be made to the relevant description of step S101 in FIG. 1, and will not be described again here.

In embodiments of the present disclosure, the following steps may be used to select the NSACF for the network slice.

In step S5011, after receiving a PDU session creation request or a PDU session update request from a UE via an access and mobility management function (AMF), the NSACF is selected for the network slice. The PDU session creation request and the PDU session update request carry S-NSSAIs.

When the UE requests to create a PDU session, the UE may send a PDU session creation request to the AMF, and the AMF sends a PDU session establishment request message to the first SMF in response to the PDU session creation request. The first SMF selects the NSACF for the network slice identified by the S-NSSAI based on the service area information of the NSACF in response to the PDU session establishment request message.

When the UE requests to update the PDU session, the UE may send a PDU session update request to the AMF, and the AMF sends a PDU session update request message to the first SMF in response to the PDU session update request. The first SMF selects the NSACF for the network slice identified by the S-NSSAIs based on the service area information of NSACF in response to the PDU session update request message.

Regarding the specific details of selecting the NSACF for the network slice, reference may be made to the relevant description of step S101 in FIG. 1, steps S201 and S2011 to S2013 in FIG. 2, steps S301 and S3011 in FIG. 3, and steps S401 and S4011 to S4012 in FIG. 4, which will not be repeated here.

According to the method for selecting the NSACF in embodiments of the present disclosure, the SMF may perform NSACF selection in response to the PDU session creation request or the PDU session update request.

Figure 6:
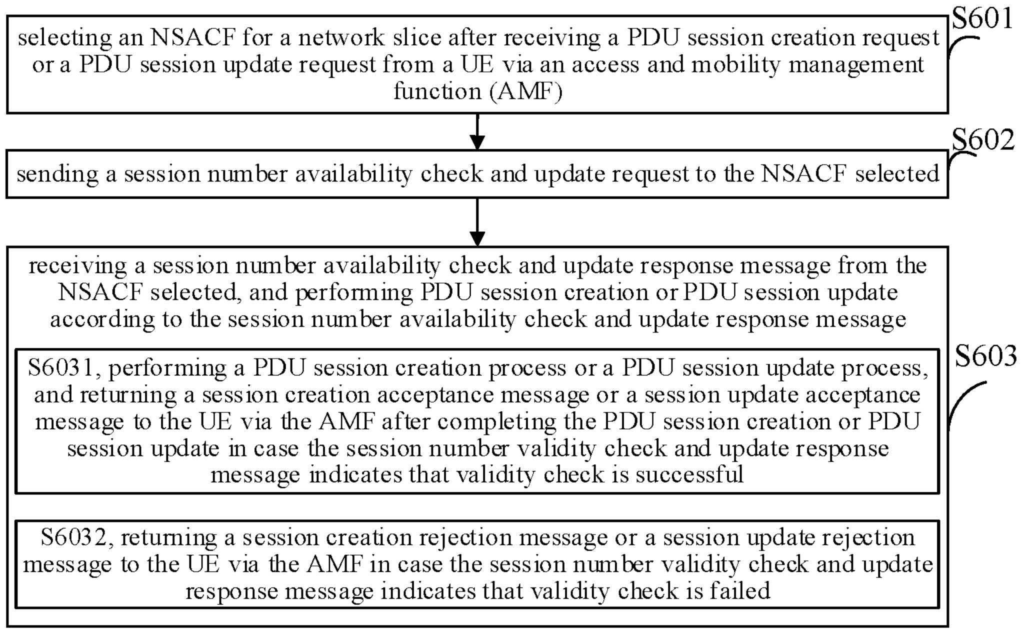
FIG. 6 is a schematic flowchart of a method for selecting a network slice admission control function (NSACF) provided by an embodiment of the present disclosure.

FIG. 6 shows a schematic flowchart of a method for selecting an NSACF according to an embodiment of the present disclosure. The method may be performed by a first SMF. As shown in FIG. 6, the method may include the following steps.

In step S601, after receiving a PDU session creation request or a PDU session update request from a UE via an access and mobility management function (AMF), an NSACF is selected for a network slice. The PDU session creation request and the PDU session update request carry S-NSSAIs.

For specific details of S601, reference may be made to the relevant description of step S5011 in FIG. 5, which will not be described again here.

In step S602, a session number availability check and update request is sent to the NSACF selected. The session number availability check and update request includes the S-NSSAIs and an update marker, and the update marker indicates to increase the number of the created PDU sessions.

After selecting the NSACF, the first SMF may send the session number availability check and update request message to the NSACF selected, so that the NSACF may check the number of the created PDU sessions based on the session number availability check and update request message.

In step S603, the session number availability check and update response message is received from the NSACF selected, and PDU session creation or PDU session update is performed according to the session number availability check and update response message.

In the case of the PDU session creation, after receiving the session number availability check and update request message, the NSACF performs check on the number of the created PDU sessions in response to the request message, and updates the number of the created PDU sessions and/or feedbacks the session number availability check and update response message based on check results. After receiving the session number availability check and update response message, the first SMF may create a PDU session based on the response message.

In the case of PDU session update, after receiving the session number availability check and update request message, the NSACF performs check on the number of the created PDU sessions in response to the request message, and updates the number of the created PDU sessions and/or feedbacks the session number availability check and update response message based on check results. After receiving the session number availability check and update response message, the first SMF may update the PDU session based on the response message.

In some embodiments, the above step S603 may include the following steps.

In step S6031, in case that the session number availability check and update response message indicates that the availability check is successful, a PDU session creation process or a PDU session update process is performed, and a session creation acceptance message or a session creation update acceptance message are returned to the UE via the AMF after completing the PDU session creation or the PDU session update.

In the case of the PDU session creation, if the session number availability check and update response message indicates that the availability check is successful, it indicates that the PDU session may be created with respect to the network slice, the first SMF performs the PDU session creation process based on the session number availability check and update response message, and returns the session creation acceptance message to the UE via the AMF after completing the PDU session creation process.

In the case of PDU session update, if the session number availability check and update response message indicates that the availability check is successful, it indicates that the PDU session may be updated with respect to the network slice, the first SMF performs the PDU session update process based on the session number availability check and update response message, and returns the session update acceptance message to the UE via the AMF after completing the PDU session update process.

In step S6032, in case of the session number availability check and update response message indicates that the availability check failed, a session creation rejection message or a session update rejection message is returned to the UE via the AMF.

In the case of PDU session creation, if the session number availability check and update response message indicates that the availability check failed, it indicates that the PDU session cannot be created with respect to the network slice, such as, the number of the created PDU sessions for the network slice has reached the maximum number, the first SMF returns the session creation rejection message to the UE via the AMF based on the session number availability check and update response message.

In the case of PDU session update, if the session number availability check and update response message indicates the availability check is failed, it indicates that the PDU session cannot be updated with respect to this network slice, such as, the number of the created PDU sessions for the network slice has reached the maximum number, the first SMF returns the session update rejection message to the UE via the AMF based on the session number availability check and update response message.

According to the method for selecting the NSACF in embodiments of the present disclosure, after selecting the NSACF, the SMF may use the NSACF to monitor the number of the created PDU sessions of the corresponding network slice.

Figure 7:
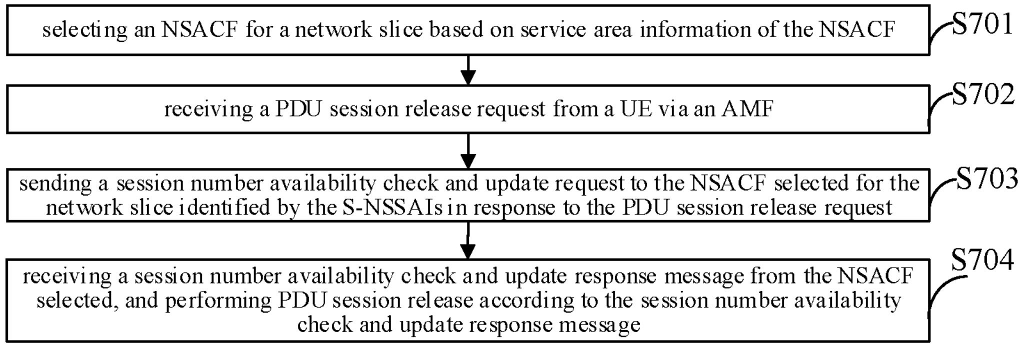
FIG. 7 is a schematic flowchart of a method for selecting a network slice admission control function (NSACF) provided by an embodiment of the present disclosure.

FIG. 7 shows a schematic flowchart of a method for selecting an NSACF according to an embodiment of the present disclosure. The method may be performed by a first SMF. As shown in FIG. 7, the method may include the following steps.

In step S701, an NSACF is selected for a network slice based on service area information of the NSACF. The NSACF selected is used to monitor a number of created protocol data unit (PDU) sessions of the network slice.

In some embodiments, the service area information may include any one or more of a tracking area identity list; service area information of the SMF; or service area information of one or more user plane functions (UPFs) controlled by the SMF.

Regarding the specific details of S701, reference may be made to the relevant descriptions of step S101 in FIG. 1, steps S201 and S2011 to S2013 in FIG. 2, steps S301 and S3011 in FIG. 3, steps S401 and S4011 to S4012 in FIG. 4, and steps S501 and S5011 in FIG. 5, and step S601 in FIG. 6, which will not be described again here.

In step S702, a PDU session release request is received from a UE via an AMF. The PDU session release request carries S-NSSAIs.

When the UE requests to release the PDU session, the UE may send the PDU session release request to the AMF, and the AMF sends a PDU session release request message to the first SMF in response to the PDU session release request.

In step S703, in response to the PDU session release request, a session number availability check and update request is sent to the NSACF selected for the network slice identified by the S-NSSAI. The session number availability check and update request includes the NSSAI and an update marker, and the update marker indicates to reduce the number of the created PDU sessions.

In response to the PDU session release request from the UE, the first SMF searches the NSACF selected for the network slice identified by the S-NSSAI included in the PDU session release request, and sends the session number availability check and update request message to an NSACF found, so that the NSACF may perform check on the number of the created PDU sessions based on the session number availability check and update request message.

In step S704, the session number availability check and update response message is received from the NSACF selected, and the PDU session release is performed according to the session number availability check and update response message.

After receiving the session number availability check and update request message, the NSACF performs check on the number of the created PDU sessions in response to the request message, and updates the number of the created PDU sessions and/or feedbacks the session number availability check and update response message according to check results. In embodiments of the present disclosure, since the update marker in the availability check and update request indicates reducing the number of the created PDU sessions, the NSACF reduces the number of the created PDU sessions according to the update marker. After completing the reduction in the number of the created PDU sessions, the NSACF feedbacks the availability check and update response message to the first SMF. After receiving the session number availability check and update response message, the first SMF may confirm that the NSACF updates the number of the created PDU sessions in the corresponding network slice according to the availability check and update response message, thereby releasing the PDU session.

According to the method for selecting the NSACF in embodiments of the present disclosure, after selecting the NSACF, the SMF may use the NSACF to monitor the number of the created PDU sessions of the corresponding network slice.

Figure 8:
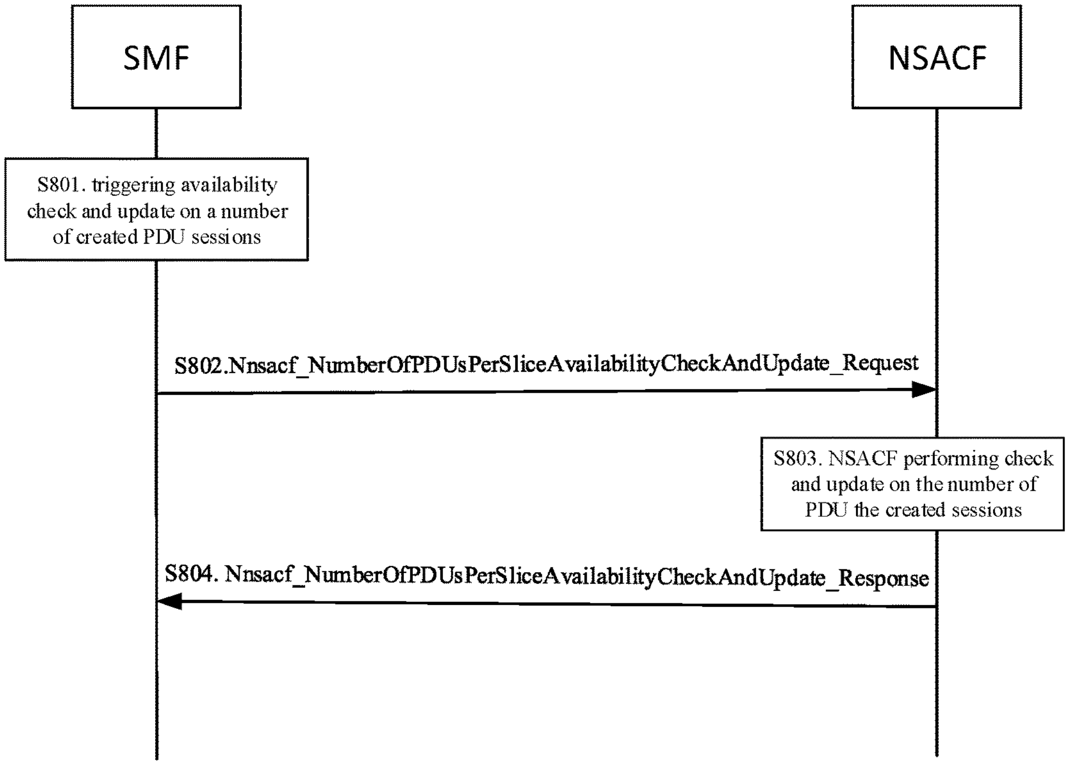
FIG. 8 shows an interactive process regarding the selection of the NSACF, availability checking and updating of the number of the created PDU sessions according to an embodiment of the present disclosure.

FIG. 8 shows an interactive process regarding the selection of NSACF, availability checking and updating of the number of the created PDU sessions according to an embodiment of the present disclosure. As shown in FIG. 8, the SMF selects the NSACF, and interacts with the NSACF to implement availability check and update on the number of the created PDU sessions. Specifically, it includes the following processes.

In step S801, availability check and update on the number of the created PDU sessions is triggered.

The availability check and update on the number of the created PDU sessions may be triggered in response to messages received by the SMF from other devices or may be triggered by the SMF based on some preset triggering mechanism.

For example, the availability check and update on the number of the created PDU sessions may be triggered in response to a PDU session creation request from the UE. In case of the PDU session creation, the SMF may perform NSACF selection by considering the S-NSSAIs carried in the PDU session creation request based on the service area information of the NSACF. The service area information of the NSACF may include any one or more of a tracking area identification list, the service area information of the SMF, or the service area information of the one or more user plane functions (UPFs) controlled by the SMF. In the selection of performing the NSACF, if the NSACF that has been selected for the network slice and the service area information of the NSACF indicates that the NSACF selected may be used for network slice, the SMF still selects the NSACF selected for the network slice to monitor the number of the created PDU sessions of the network slice. If a plurality of NSACFs have been selected for the network slice and the service area information of the plurality of NSACFs indicates that the plurality of NSACFs selected may be used for the network slice, the SMF selects the NSACF for the network slice from the plurality of NSACFs selected to monitor the number of the created PDU sessions. For example, the SMF selects the NSACF for the network slice from plurality of NSACFs selected based on the service capabilities of the NSACF to monitor the number of the created PDU sessions of the network slice. In addition, if an operator service area policy exists, the SMF selects the NSACF for the network slice based on the service area information of the NSACF and the operator service area policy to monitor the number of the created PDU sessions of the network slice. Selection of the NSACF may be performed when PDU session is created or updated. In addition, the NSACF selection process described in the preset disclosure also applies to the selection of the NSACF instances.

The NSACF may be registered in the NRF, the NSACF provides its configuration information to the NRF, and the NRF marks the NSACF as available. For the PDU session creation process, the NSACF may provide the S-NSSAIs and the service area information of the NSACF as input information. If the NSACF is registered in the NRF, the SMF may utilize the NRF to select the NSACF.

The NSACF may be configured in the SMF, and the configuration information of the NSACF may indicate the service area information of the NSACF and the S-NSSAIs. If NSACF is configured in the SMF, the SMF may use the configuration information of the NSACF in the SMF to select the NSACF.

The operator service area policy may be pre-configured in the SMF and/or the NRF.

In another example, the availability check and update on the number of the created PDU sessions may be triggered in response to the PDU session release request from the UE.

In yet another example, the availability check and update on the number of the created PDU sessions may be triggered in response to the PDU session creation failure.

In step S802, the SMF sends a availability check and update request message to the NSACF selected.

The availability check and update request (Nnsacf_NumberOfPDUsPerSliceAvailabilityCheckAndUpdate_Request) message includes the S-NSSAIs and the update marker. The update marker may indicate to increase the number of the created PDU sessions in case that the availability check and update request is triggered at a beginning of the PDU session creation process, or indicate to reduce the number of the created PDUs in case that the availability check and request is triggered at an end of the PDU session release process.

In step S803, the NSACF checks and updates the number of the created PDU sessions based on the availability check and update request message provided by the SMF.

If the update marker in the availability check and update request message indicates to increase the number of the created PDU sessions and the NSACF determines that the number of the created PDU sessions for the network slice identified by the S-NSSAI in the availability check and update request message has not yet reached the maximum number, the NSACF will increase the number of the created PDU sessions.

If the update marker in the availability check and update request message indicates to increase the number of the created PDU sessions and the NSACF determines that the number of the created PDU sessions for the network slice identified by the S-NSSAI in the availability check and update request message has reached the maximum number, the NSACF will not increase the number of the created PDU sessions, and will return a result parameter indicating that the number of the created PDU sessions for the corresponding network slice has reached the maximum number.

If the update marker in the availability check and update request message indicates to reduce the number of the created PDU sessions, the NSACF will reduce the number of the created PDU sessions for the corresponding network slice.

In step S804, the NSACF feedbacks the availability check and update response message to the SMF.

When the NSACF discovers that the number of the created PDU sessions for the corresponding network slice has reached the maximum number, the availability check and update response (Nnsacf_NumberOfPDUsPerSliceAvailabilityCheckAndUpdate_Response) message fed back by the NSACF to SMF may include the result parameters as described above.

In the case of the PDU session creation, if the feedback of the NSACF indicates that the number of the created PDU sessions of the network slice has reached the maximum number of result parameters, the SMF will reject the PDU session creation request and return the session creation rejection message to the UE.

In the case that the PDU session creation fails, the SMF may trigger the availability check and update regarding the number of the created PDU sessions again, and the availability check and update request message includes the update marker indicating to reduce the number of the created PDU sessions, so that the number of the created PDU sessions is adjusted again in the NSACF.

Figure 9:
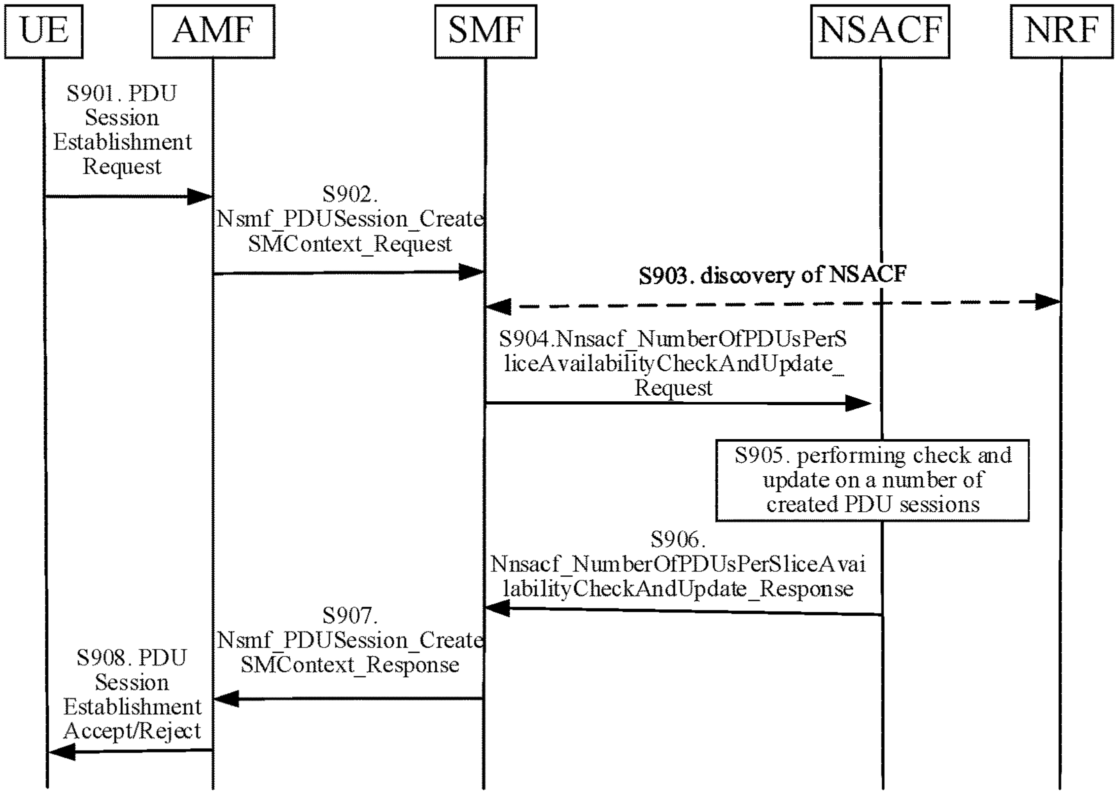
FIG. 9 shows an interactive process regarding the selection of the NSACF, availability check and update of the number of the created PDU sessions in case of PDU session creation according to an embodiment of the present disclosure.

For example, FIG. 9 shows an interactive process regarding the selection of the NSACF, availability check and update on the number of the created PDU sessions in case of PDU session creation according to an embodiment of the present disclosure. As shown in FIG. 9, the SMF selects the NSACF and interacts with the NSACF to implement the availability check and update on the number of the created PDU sessions by the slice. Specifically, it includes the following processes.

In step S901, the UE sends a PDU session establishment request to an AMF. The PDU session establishment request carries S-NSSAIs.

In step S902, the AMF sends the PDU session establishment request message (Nsmf_PDUSession_CreateSMContext_Request) to the SMF. The PDU session establishment request message carries the S-NSSAIs.

After the SMF receives the PDU session establishment request message, the SMF may select the NSACF by considering the S-NSSAIs carried in the PDU session establishment request based on the service area information of the NSACF. The service area information of the NSACF may include any one or more of the tracking area identification list, the service area information of the SMF, or the service area information of one or more user plane functions (UPFs) controlled by the SMF. In performing the selection of the NSACF, if the NSACF has been selected for the network slice and the service area information of the NSACF indicates that the NSACF selected is capable being used for the network slice, the SMF still selects the NSACF selected for the network slice to monitor the number of the created PDU sessions of the network slice. If a plurality of NSACFs have been selected for the network slice and the service area information of the plurality of NSACFs indicates that the plurality of NSACFs selected a re capable of being used for the network slice, the SMF selects the NSACF for the network slice from the plurality of NSACFs selected for monitoring the number of the created PDU sessions of the network slice. For example, the SMF selects the NSACF for the network slice from the plurality of NSACFs selected based on the service capability of the NSACF to monitor the number of the created PDU sessions of the network slice. In addition, if an operator service area policy exists, the SMF selects the NSACF for the network slice based on the service area information of the NSACF and the operator service area policy to monitor the number of the created PDU sessions of the network slice. The selection of the NSACF may be performed when the PDU session is created or updated. In addition, the NSACF selection process described in the present disclosure also applies to the selection of NSACF instances.

The NSACF may be registered in the NRF. The NSACF provides its configuration information to the NRF, and the NRF marks the NSACF as available. For the PDU session creation process, the NSACF may provide the S-NSSAIs and the service area information of the NSACF as input information. If the NSACF is registered in the NRF, the SMF may utilize the NRF to select the NSACF.

The NSACF may be configured in the SMF, and the configuration information of the NSACF may indicate the service area information of the NSACF and the S-NSSAIs. If the NSACF is configured in the SMF, the SMF may use the configuration information of the NSACF in the SMF to select the NSACF.

The operator service area policy may be pre-configured in the SMF and/or the NRF.

In step S903, the SMF performs the NSACF discovery.

If the SMF does not have an NSACF address, the SMF queries the NRF to obtain the NSACF address. The SMF provides information including the S-NSSAIs and NF type to the NRF to query the NSACF address. The NRF obtains the NSACF address that monitors the number of slice sessions for the S-NSSAI, and returns the NSACF address to the SMF. If the SMF has the NSACF address, this step may be skipped.

In step S904, the SMF sends an availability check and update request message (Nnsacf_NumberOfPDUsPerSliceAvailabilityCheckAndUpdate_Request) to the NSACF selected.

In step S905, the NSACF performs check and update on the number of the created PDU sessions.

In step S906, the NSACF feedbacks the availability check and update response message (Nnsacf_NumberOfPDUsPerSliceAvailabilityCheckAndUpdate_Response) to the SMF.

In step S907, the SMF feedbacks the PDU session establishment response message (Nsmf_PDUSession_CreatSMContext_Response) to the AMF.

In step S908, the AMF feedbacks a PDU session establishment accept/rejection message to the UE.

Figure 10:
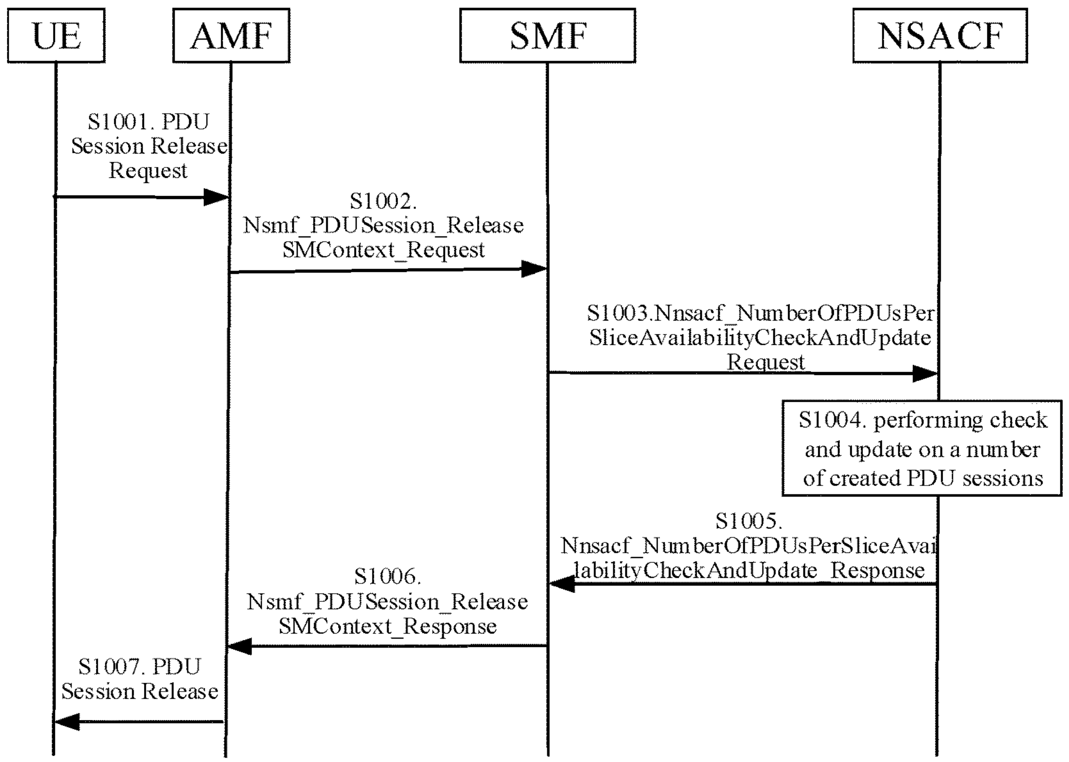
FIG. 10 shows an interactive process of availability checking and updating of the number of the created PDU sessions in case of PDU session release according to an embodiment of the present disclosure.

As another example, FIG. 10 shows an interactive process of availability checking and updating of the number of the created PDU sessions in case of PDU session release according to an embodiment of the present disclosure. As shown in FIG. 10, the SMF interacts with the NSACF to implement the availability check and update on the number of the created PDU sessions. Specifically, it includes the following processes.

In step S1001, the UE sends a PDU session release request to the AMF.

In step S1002, the AMF sends a PDU session release request message (Nsmf_PDUSession_ReleaseSMContext_Request) to the SMF.

In step S1003, the SMF sends an availability check and update request message (Nnsacf_NumberOfPDUsPerSliceAvailabilityCheckAndUpdate_Request) to the NSACF selected.

In step S1004, the NSACF performs check and update on the number of the created PDU sessions.

In step S1005, the NSACF feedbacks the availability check and update response message (Nnsacf_NumberOfPDUsPerSliceAvailabilityCheckAndUpdate_Response) to the SMF.

In step S1006, the SMF feedbacks the PDU session release response message (Nsmf_PDUSession_ReleaseSMContext_Response) to the AMF.

In step S1007, the AMF feedbacks a PDU session release message to the UE.

In the above-mentioned embodiments provided by the present application, the methods provided by the embodiments of the present application are introduced from the perspective of the network equipment. In order to implement each function in the method provided by the above-mentioned embodiments of the present application, the network device may include a hardware structure and a software module to implement the above-mentioned functions in a form of a hardware structure, a software module, or a hardware structure and a software module. One of the above-mentioned functions may be executed by a hardware structure, a software module, or a hardware structure and a software module.

Corresponding to the method for selecting the NSACF provided by the above-mentioned embodiments, the present disclosure also provides an apparatus for selecting an NSACF. Since the apparatus for selecting the NSACF provided by embodiments of the present disclosure is consistent with the method for selecting the NSACF provided by the above-mentioned embodiments, the implementation of the method for selecting the NSACF is also applicable to the apparatus for selecting the NSACF provided in embodiments of the present disclosure, which will not be described in detail in embodiments of the present disclosure.

Figure 11:
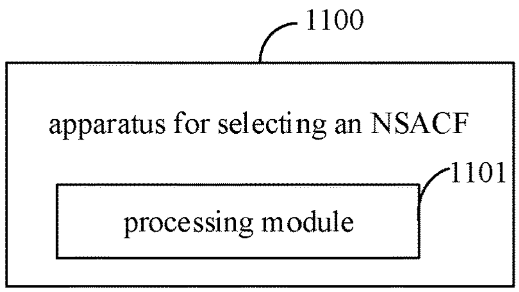
FIG. 11 is a schematic diagram of an apparatus for selecting a network slice admission control function (NSACF) provided by an embodiment of the present disclosure.

FIG. 11 is a schematic diagram of an apparatus 1100 for selecting an NSACF provided by an embodiment of the present disclosure.

As shown in FIG. 11, the apparatus 1100 is applied to a first session management function (SMF), and may include a processing module 1101. The processing module 1101 is configured to select an NSACF for a network slice based on service area information of the NSACF. The NSACF selected is used to monitor a number of created protocol data unit (PDU) sessions of the network slice.

According to the apparatus for selecting the NSACF of embodiments of the present disclosure, the SMF selects the NSACF for the network slice based on the service area information of the NSACF. By considering the service area information of the NSACF, the NSACF is selected, the SMF may select the appropriate NSACF more accurately and with less signaling and functional interaction.

In some embodiments, the service area information includes any one or more of: a tracking area identity list; service area information of the SMF; service area information of one or more user plane functions (UPFs) controlled by the SMF.

In some embodiments, the processing module 1101 is configured to maintain the NSACF selected to be selected for the network slice in case an NSACF has been selected for the network slice and the service area information of the NSACF indicates that the NSACF selected is capable of being used for the network slice.

In some embodiments, the processing module 1101 is configured to select an NSACF for the network slice from a plurality of NSACFs selected in case the plurality of NSACFs have been selected for the network slice and service area information of the plurality of NSACFs indicates that the plurality of the NSACFs selected are capable of being used for the network slice.

In some embodiments, the processing module 1101 is configured to select an NSACF for the network slice from the plurality of the NSACFs selected based on service capability of the NSACF. The service capability includes at least one of: a first service capability that supports monitoring a number of registered user equipments (UEs) of the network slice, and a second service capability that supports monitoring a number of the created PDU sessions of the network slice.

In some embodiments, the processing module 1101 is configured to select an NSACF not belonging to one or more NSACFs selected for the network slice in case the one or more NSACFs exist that have been selected for the network slice and service area information of the one or more NSACFs indicates that the one or more NSACFs selected are not used for the network slice.

In some embodiments, the processing module 1101 is configured to select an NSACF for the network slice based on the service area information of the NSACF and the operator service area policy. The operator service area policy includes a specific rule formulated by an operator to perform NSACF selection based on the service area information.

In some embodiments, the operator service area policy is pre-configured in at least one of the first SMF and a network repository function (NRF).

In some embodiments, the processing module 1101 is configured to select an NSACF for the network slice from registered NSACFs of the NRF. The NRF stores configuration information of the registered NSACFs, and the configuration information includes single-network slice selection assistance information (S-NSSAI) and service area information of the registered NSACFs.

In some embodiments, the processing module 1101 is configured to select an NSACF for the network slice from pre-configured NSACFs of the first SMF. The first SMF stores configuration information of the pre-configured NSACFs, and the configuration information includes single-network slice selection assistance information (S-NSSAI) and service area information of the pre-configured NSACFs.

Figure 12:
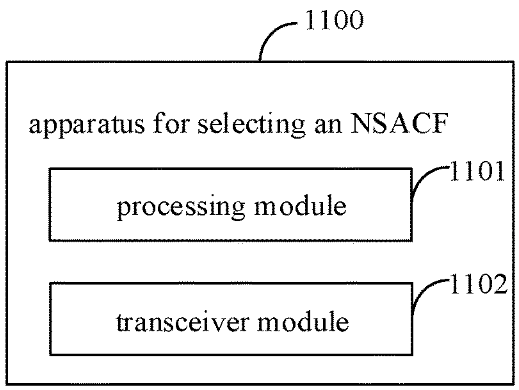
FIG. 12 is a schematic diagram of an apparatus for selecting a network slice admission control function (NSACF) provided by an embodiment of the present disclosure.

In some embodiments, as shown in FIG. 12, the apparatus 1100 further includes a transceiver module 1102. The transceiver module 1102 is configured to receive a PDU session creation request or a PDU session update request from a UE via an access and mobility management function (AMF). The PDU session creation request and the PDU session update request carry S-NSSAIs. The processing module 1101 is configured to select the NSACF for the network slice after the transceiver module receives the PDU session creation request or the PDU session update request.

In some embodiments, the transceiver module 1102 is further configured to send a session number availability check and update request to the NSACF selected, in which the session number availability check and update request includes the S-NSSAIs and an update marker, and the update marker indicates to increase the number of the created PDU sessions;

and receive a session number availability check and update response message from the NSACF selected. The processing module 1101 is further configured to perform PDU session creation or PDU session update according to the session number availability check and update response message.

In some embodiments, the processing module 1101 is further configured to perform a PDU session creation process or a PDU session update process and indicate the transceiver module 1102 to return a session creation acceptance message or a session update acceptance message to the UE via the AMF after completing the PDU session creation or the PDU session update in case the session number availability check and update response message indicates that availability check is successful; and indicate the transceiver module 1102 to return a session creation rejection message or a session update rejection message to the UE via the AMF in case the session number availability check and update response message indicates that availability check is failed.

In some embodiments, the transceiver module 1102 is configured to receive a PDU session release request from a UE via an AMF, in which the PDU session release request carries S-NSSAIs; send a session number availability check and update request to the NSACF selected for the network slice identified by the S-NSSAIs in response to the PDU session release request, in which the session number availability check and update request includes the S-NSSAIs and an update marker, and the update marker indicates to reduce the number of the created PDU sessions; and receive a session number availability check and update response message from the NSACF selected. The processing module 1101 is configured to perform PDU session release according to the session number availability check and update response message.

Figure 13:
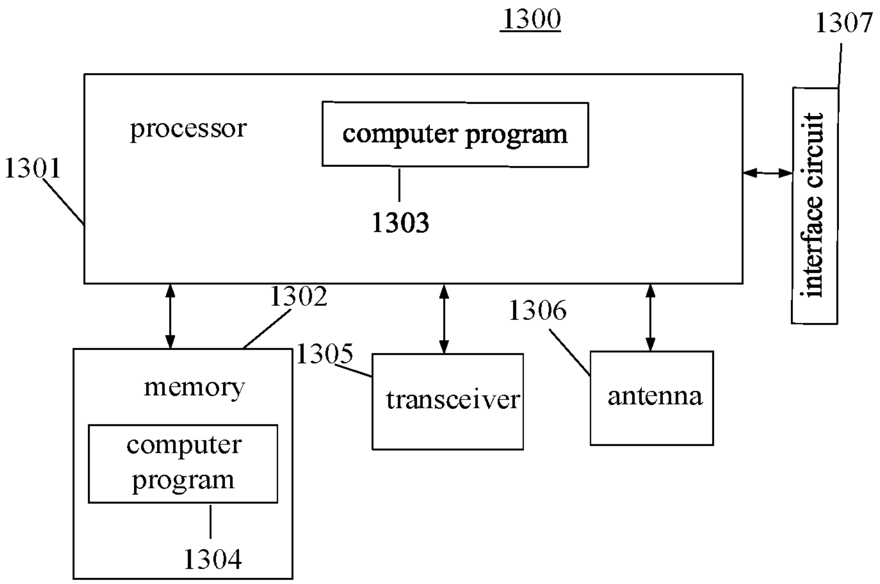
FIG. 13 is a schematic diagram of a communication device provided by an embodiment of the present disclosure.

As shown in FIG. 13, which is a schematic diagram of a communication device 1300 provided by an embodiment of the present application. The communication device 1300 may be a network device, a user equipment, a chip, a chip system, or a processor that supports the network device to implement the above-mentioned method, or also may be a chip, a chip system, or a processor that supports the terminal device to implement the above-mentioned method. The device may be used to implement the method described in the above-mentioned method embodiment. For details, reference may be made to the description in the above-mentioned method embodiments.

The communication device 1300 may include one or more processors 1301. The processor 1301 may be a general-purpose processor or a special-purpose processor, or the like. For example, it may be a baseband processor or a central processing unit. The baseband processor may be used to process communication protocols and communication data. The central processor may be used to control communication devices (such as base stations, baseband chips, terminal device, terminal device chips, DU or CU, etc.) and execute computer programs and processing data for computer programs.

Alternatively, the communication device 1300 may also include one or more memories 1302, on which a computer program 1304 may be stored. The processor 1301 executes the computer program 1304, so that the communication device 1300 performs the steps described in the above-mentioned method embodiments. Alternatively, the memory 1302 may also store data. The communication device 1300 and the memory 1302 may be provided separately or integrated together.

Alternatively, the communication device 1300 may also include a transceiver 1305 and an antenna 1306. The transceiver 1305 may be called a transceiver unit, a transceiver, a transceiver circuit, etc., and is configured to implement transceiver functions. The transceiver 1305 may include a receiver and a transmitter. The receiver may be called a receiver or a receiving circuit, etc., and is configured to implement the receiving function. The transmitter may be called a transmitter, a transmitting circuit, etc., and configured to implement the transmitting function.

Alternatively, the communication device 1300 may also include one or more interface circuits 1307. The interface circuit 1307 is configured to receive code instructions and transmit them to the processor 1301. The processor 1301 executes the code instructions to cause the communication device 1300 to perform the method described in the above-mentioned method embodiments.

The communication device 1300 is a network device. The processor 1301 is configured to execute step S101 in FIG. 1, steps S201 and S2011 to S2013 in FIG. 2, steps S301 and S3011 in FIG. 3, and steps S401 and S4011 to S4012 in FIG. 4, steps S501 and S5011 in FIG. 5, steps S601, S603 and S6031 in FIG. 6, steps S701 and S704 in FIG. 7. The transceiver 1305 is configured to execute steps S602 to S603 and S6031 to 6032 in FIG. 6, and steps S702 to S704 in FIG. 7.

In one implementation, the processor 1301 may include a transceiver for implementing receiving and transmitting functions. For example, the transceiver may be a transceiver circuit, an interface, or an interface circuit. The transceiver circuits, the interfaces or the interface circuits configured to implement the receiving and transmitting functions may be separate or integrated together. The above-mentioned transceiver circuit, the interface or the interface circuit may be configured for reading and writing codes/data, or the above-mentioned transceiver circuit, the interface or the interface circuit may be configured for signal transmission or transfer.

In one implementation, the processor 1301 may store a computer program 1303, and the computer program 1303 runs on the processor 1301, causing the communication device 1300 to perform the method described in the above-mentioned method embodiment. The computer program 1303 may be embedded in the processor 1301, in which case the processor 1301 may be implemented in hardware.

In one implementation, the communication device 1300 may include a circuit, and the circuit may implement sending or receiving or communicating functions in the above-mentioned method embodiments. The processor and transceiver described in the present disclosure may be implemented in an integrated circuits (IC), an analog IC, a radio frequency integrated circuits (RFIC), a mixed signal (IC), an application specific integrated circuits (ASIC), a printed circuit boards (PCB), electronic equipment, etc. The processor and transceiver may also be manufactured using various IC process technologies, such as a complementary metal oxide semiconductor (CMOS), a N-type metal-oxide-semiconductor (NMOS), a P-type metal oxide semiconductor (PMOS), a bipolar junction transistor (BJT), a bipolar CMOS (BiCMOS), a silicon germanium (SiGe), a gallium arsenide (GaAs), etc.

The communication device described in the above-mentioned embodiments may be a network device or a terminal device (such as the first terminal device in the above-mentioned method embodiments), but the scope of the communication device described in the present disclosure is not limited thereto, and the structure of the communication device is not limited by FIG. 13. The communication device may be a stand-alone device or may be part of a larger device. For example, the communication device may be:

independent integrated circuit (IC), or chip, or chip system or subsystem;

a collection of one or more ICs, or, the IC collection may also include storage components for storing data and computer programs;

ASIC, such as modem;

modules that may be embedded in other devices;

receivers, terminal device, intelligent terminal device, cellular phones, wireless equipment, handheld devices, mobile units, vehicle-mounted equipment, network device, cloud equipment, artificial intelligence equipment, etc.;

others.

Figure 14:
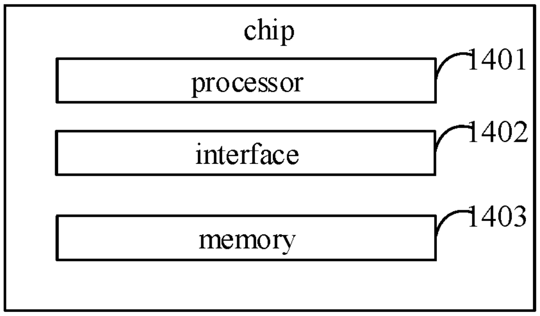
FIG. 14 is a schematic diagram of a chip provided by an embodiment of the present disclosure.

In case that the communication device may be a chip or a chip system, reference may be made to the schematic diagram of the chip shown in FIG. 14. The chip shown in FIG. 14 includes a processor 1401 and an interface 1402. The number of the processors 1401 may be one or more, and the number of the interfaces 1402 may be multiple.

For the case where the chip is configured to implement the functions of the network device in embodiments of the present disclosure, the processor 1401 is configured to execute step S101 in FIG. 1, steps S201 and S2011 to S2013 in FIG. 2, steps S301 and S3011 in FIG. 3, steps S401 and S4011 to S4012 in FIG. 4, steps S501 and S5011 in FIG. 5, steps S601, S603 and S6031 in FIG. 6, steps S701 and S704 in FIG. 7; the interface 1402 is configured to execute the steps S602 to S603 in FIG. 6, and steps S702 to S704 in FIG. 7.

Alternatively, the chip also includes a memory 1403, which is configured to store necessary computer programs and data.

Those skilled in the art may also understand that the various illustrative logical blocks and steps listed in embodiments of the present disclosure may be implemented by electronic hardware, computer software, or a combination of both. Whether such functionality is implemented in hardware or software depends on the specific application and overall system design requirements. Those skilled in the art may use various methods to implement the described functions for each specific application, but such implementation should not be understood as exceeding the protection scope of embodiments of the present application.

The present disclosure also provides a readable storage medium on which instructions are stored, and when the instructions are executed by a computer, the functions of any of the above-mentioned method embodiments are implemented.

The present disclosure also provides a computer program product. When the computer program produce is executed by a computer, the functions of any of the above-mentioned method embodiments are implemented.

In the above-mentioned embodiments, it may be implemented in whole or in part by software, hardware, firmware, or any combination thereof. When implemented using software, it may be implemented in whole or in part in the form of a computer program product. The computer program product includes one or more computer programs. When a computer program is loaded and executed on a computer, processes or functions described in embodiments of the present disclosure are generated in whole or in part. The computer may be a general purpose computer, a special purpose computer, a computer network, or other programmable device. The computer program may be stored in or transferred from one computer-readable storage medium to another computer-readable storage medium, for example, the computer program may be transmitted from a website, a computer, a server, or a data center via a wireline (e.g. coaxial cable, optical fiber, digital subscriber line (DSL)) or wireless (such as infrared, wireless, microwave, etc.) means to transmit to another website, computer, server or data center). The computer-readable storage media may be any available media that may be accessed by a computer or a data storage device such as a server, data center, or other integrated media that contains one or more available media. The usable media may be magnetic media (e.g., floppy disks, hard disks, tapes), optical media (e.g., high-density digital video discs (DVDs)), or semiconductor media (e.g., solid state disks (SSDs)) and the like.

Those skilled in the art may understand that the first, second, and other numerical numbers involved in the present disclosure are only for convenience of description and are not used to limit the scope of embodiments of the present disclosure and also indicate the order.

At least one in the present disclosure may also be described as one or more, and the plurality may be two, three, four or more, and the present disclosure is not limited. In embodiments of the present disclosure, for a technical feature, the technical feature is distinguished by "first", "second", "third", "A", "B", "C" and "D", etc. The technical features described in "first", "second", "third", "A", "B", "C" and "D" are in no particular order or order.

As used herein, the terms "machine-readable medium" and "computer-readable medium" refer to any computer program product, apparatus, and/or device for providing machine instructions and/or data to a programmable processor (such as, a magnetic disk, an optical disk, a memory, a programmable logic device (PLD)), including machine-readable media that receive machine instructions as machine-readable signals. The term "machine-readable signal" refers to any signal used to provide machine instructions and/or data to a programmable processor.

The systems and techniques described herein may be implemented in a computing system (e.g., as a data server) that includes back-end components, or a computing system (e.g., an application server) that includes middleware components, or a computing system (e.g., a user computer having a graphical user interface or web browser through which the user may interact with implementations of the systems and technologies described herein) that includes front-end components, or a computing system including any combination of such back-end components, such middleware components, or such front-end components. The components of the system may be interconnected by any form or medium of digital data communication (e.g., a communication network). Examples of the communication networks include a local area network (LAN), a wide area network (WAN), and the Internet.

The computer systems may include a client and a server. The client and the server are generally remote from each other and generally interact via a communications network. A relationship of the client and the server is created by the computer programs running on corresponding computers and having a client-server relationship with each other.

It is understood that various forms of the process shown above may be used, with steps reordered, added or deleted. For example, each step described in the present disclosure may be executed in parallel, sequentially, or in a different order, as long as the desired results of the technical solution disclosed in the present disclosure may be achieved, which will not be limited here.

In addition, it is understood that the various embodiments described in the present disclosure may be implemented alone or in combination with other embodiments if the scheme allows.

Those skilled in the art will appreciate that the units and algorithm steps of each example described in conjunction with embodiments disclosed herein may be implemented with electronic hardware, or a combination of computer software and electronic hardware. Whether these functions are performed in hardware or software depends on the specific application and design constraints of the technical solution. Those skilled in the art may implement the described functionality using different methods for each specific application, but such implementations should not be considered to be beyond the scope of the present disclosure.

Those skilled in the art may clearly understand that for the convenience and simplicity of description, the specific working processes of the systems, devices and units described above may be referred to the corresponding processes in the foregoing method embodiments, and will not be described again here.

The above are only specific embodiments of the present disclosure, but the protection scope of the present disclosure is not limited thereto. Any skilled in the art may easily think of changes or substitutions within the technical scope disclosed in the present disclosure, which are covered by the protection scope of the present disclosure. Therefore, the protection scope of the present disclosure should be subject to the protection scope of the claims.

What is claimed is:

1. A method for selecting a network slice admission control function (NSACF), performed by a first session management function (SMF) and comprising:

selecting an NSACF for a network slice based on service area information of the NSACF after receiving a protocol data unit (PDU) session creation request or a PDU session update request from a user equipment (UE), wherein the NSACF selected is used to monitor a number of created PDU sessions of the network slice;

sending a session number availability check and update request to the NSACE selected, wherein the session number availability check and update request comprises single-network slice selection assistance information (S-NSSAI) and a first update flag, and the first update flag indicates to increase the number of the created PDU sessions;

receiving a session number availability check and update response message from the NSACF selected; and performing a PDU session creation procedure or a PDU session update procedure, and returning a session creation acceptance message or a session update acceptance message to the UE in case the session number availability check and update response message indicates that availability check is successful; or, returning a session creation rejection message or a session update rejection message to the UE in case the session number availability check and update response message indicates that availability check is failed.

2. The method according to claim 1, wherein the service area information comprises any one or more of:

a tracking area identity list;

service area information of the first SMF; or service area information of one or more user plane functions (UPFs) controlled by the first SMF.

3. The method according to claim 1, wherein selecting the NSACF for the network slice comprises:

maintaining the NSACF selected to be selected for the network slice in case an NSACF has been selected for the network slice and the service area information of the NSACF indicates that the NSACF selected is capable of being used for the network slice.

4. The method according to claim 1, wherein selecting the NSACF for the network slice comprises:

selecting an NSACF for the network slice from a plurality of NSACFs selected in case the plurality of NSACFs have been selected for the network slice and service area information of the plurality of NSACFs indicates that the plurality of the NSACFs selected are capable of being used for the network slice.

5. The method according to claim 4, wherein selecting the NSACF for the network slice from the plurality of the NSACFs selected comprises:

selecting an NSACF for the network slice from the plurality of the NSACFs selected based on service capability of the NSACF;

wherein the service capability comprises at least one of:

a first service capability that supports monitoring a number of registered UEs of the network slice, or a second service capability that supports monitoring a number of the created PDU sessions of the network slice.

6. The method according to claim 1, wherein selecting the NSACF for the network slice comprises:

selecting an NSACF not belonging to one or more NSACFs selected for the network slice in case the one or more NSACFs have been selected for the network slice and service area information of the one or more NSACFs indicates that the one or more NSACFs selected are not used for the network slice.

7. The method according to claim 1, wherein in case an operator service area policy exists, selecting the NSACF for the network slice comprises:

selecting an NSACF for the network slice based on the service area information of the NSACF and the operator service area policy;

wherein the operator service area policy comprises a specific rule formulated by an operator to perform NSACF selection based on the service area information.

8. The method according to claim 7, wherein the operator service area policy is pre-configured in at least one of the first SMF and a network repository function (NRF).

9. The method according to claim 8, wherein selecting the NSACF for the network slice comprises:

selecting an NSACF for the network slice from registered NSACFs of the NRF, wherein the NRF stores configuration information of the registered NSACFs, and the configuration information comprises the S-NSSAI and service area information of the registered NSACFs.

10. The method according to claim 1, wherein selecting the NSACF for the network slice comprises:

selecting an NSACF for the network slice from pre-configured NSACFs of the first SMF, wherein the first SMF stores configuration information of the pre-configured NSACFs, and the configuration information comprises the S-NSSAI) and service area information of the pre-configured NSACFs.

11. The method according to claim 1, further comprising:

receiving a PDU session release request from thea UE via an AMF, wherein the PDU session release request carries S-NSSAIs;

sending a session number availability check and update request to the NSACF selected for the network slice identified by the S-NSSAIs in response to the PDU session release request, wherein the session number availability check and update request comprises the S-NSSAIs and a second update flag, and the second update flag indicates to reduce the number of the created PDU sessions; and receiving a session number availability check and update response message from the NSACF selected, and performing PDU session release according to the session number availability check and update response message.

12. A communication device being a first session management function (SMF), comprising:

a transceiver;

a memory; and a processor, connected to the transceiver and the memory and configured, by executing computer-executable instructions on the memory, to control wireless signal transmission and reception of the transceiver and to:

select a network slice admission control function NSACF for a network slice based on service area information of the NSACF after receiving a protocol data unit (PDU) session creation request or a PDU session update request from a user equipment (UE), wherein the NSACF selected is used to monitor a number of created PDU sessions of the network slice;

send a session number availability check and update request to the NSACF selected, wherein the session number availability check and update request comprises single-network slice selection assistance information (S-NSSAI) and a first update flag, and the first update flag indicates to increase the number of the created PDU sessions;

receive a session number availability check and update response message from the NSACF selected; and perform a PDU session creation procedure or a PDU session update procedure, and return a session creation acceptance message or a session update acceptance message to the UE in case the session number availability check and update response message indicates that availability check is successful; or, return a session creation rejection message or a session update rejection message to the UE in case the session number availability check and update response message indicates that availability check is failed.

13. The communication device according to claim 12, wherein the service area information comprises any one or more of:

a tracking area identity list;

service area information of the first SMF; or service area information of one or more user plane functions (UPFs) controlled by the first SMF.

14. The communication device according to claim 12, wherein the processor is further configured to:

maintain the NSACF selected to be selected for the network slice in case an NSACF has been selected for the network slice and the service area information of the NSACF indicates that the NSACF selected is capable of being used for the network slice.

15. The communication device according to claim 12, wherein the processor is further configured to:

select an NSACF for the network slice from a plurality of NSACFs selected in case the plurality of NSACFs have been selected for the network slice and service area information of the plurality of NSACFs indicates that the plurality of the NSACFs selected are capable of being used for the network slice.

16. The communication device according to claim 15, wherein the processor is further configured to:

select an NSACF for the network slice from the plurality of the NSACFs selected based on service capability of the NSACF;

wherein the service capability comprises at least one of:

a first service capability that supports monitoring a number of registered UEs of the network slice, or a second service capability that supports monitoring a number of the created PDU sessions of the network slice.

17. The communication device according to claim 12, wherein the processor is further configured to:

select an NSACF not belonging to one or more NSACFs selected for the network slice in case the one or more NSACFs have been selected for the network slice and service area information of the one or more NSACFs indicates that the one or more NSACFs selected are not used for the network slice.

18. The communication device according to claim 12, wherein the processor is further configured to:

in case an operator service area policy exists, select an NSACF for the network slice based on the service area information of the NSACF and the operator service area policy;

wherein the operator service area policy comprises a specific rule formulated by an operator to perform NSACF selection based on the service area information.

19. The communication device according to claim 12, wherein the processor is further configured to:

select an NSACF for the network slice from pre-configured NSACFs of the first SMF, wherein the first SMF stores configuration information of the pre-configured NSACFs, and the configuration information comprises the S-NSSAI and service area information of the pre-configured NSACFs.

20. The communication device according to claim 12, wherein the processor is further configured to:

receive a PDU session release request from the UE via an AMF, wherein the PDU session release request carries S-NSSAIs;

send a session number availability check and update request to the NSACF selected for the network slice identified by the S-NSSAIs in response to the PDU session release request, wherein the session number availability check and update request comprises the S-NSSAIs and a second update flag, and the second update flag indicates to reduce the number of the created PDU sessions; and receive a session number availability check and update response message from the NSACF selected, and performing PDU session release according to the session number availability check and update response message.

* * * * *